United States Patent
Merrell et al.

(10) Patent No.: US 11,435,853 B2
(45) Date of Patent: Sep. 6, 2022

(54) SELF-ALIGNING USER INTERFACE

(71) Applicant: Motorola Mobility LLC, Chicago, IL (US)

(72) Inventors: Thomas Merrell, St Charles, IL (US); John J. Gorsica, Round Lake, IL (US); Jenna Zylema, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/238,787

(22) Filed: Jan. 3, 2019

(65) Prior Publication Data

US 2020/0218397 A1 Jul. 9, 2020

(51) Int. Cl.
*G06F 3/041* (2006.01)
*G06F 3/04883* (2022.01)
*G06F 3/0346* (2013.01)
*G06V 40/13* (2022.01)
*G06V 40/12* (2022.01)

(52) U.S. Cl.
CPC .......... *G06F 3/0418* (2013.01); *G06F 3/0346* (2013.01); *G06F 3/04883* (2013.01); *G06V 40/13* (2022.01); *G06V 40/1376* (2022.01); *G06F 2203/04108* (2013.01)

(58) Field of Classification Search
None
See application file for complete search history.

(56) References Cited

U.S. PATENT DOCUMENTS

| | | | |
|---|---|---|---|
| 8,125,458 B2 | 2/2012 | Keam | |
| 9,715,283 B2 | 7/2017 | Elkins et al. | |
| 2011/0267262 A1* | 11/2011 | Gollier | G06F 3/0423 345/156 |
| 2012/0019562 A1* | 1/2012 | Park | G06F 3/0488 345/173 |
| 2014/0139637 A1* | 5/2014 | Mistry | G06F 1/163 348/46 |
| 2017/0193261 A1* | 7/2017 | Schwartz | G06V 10/242 |

OTHER PUBLICATIONS

"One Button Navigation—Moto g5 Plus", Motorola Customer Help—Online; Unknown Exact publication date but prior to filing of present application; viewed online May 13, 2021 at https://motorola-global-portal.custhelp.com/app/answers/indevice_detail/a_id/116532/p/30,6720,10165.

* cited by examiner

*Primary Examiner* — Carl Adams

(57) ABSTRACT

Systems and methods for providing a self-aligning user interface in a mobile electronic communications device having a touch sensitive surface include detecting a finger touch on the touch sensitive surface and determining an angular orientation of the touching finger in a continuous angular coordinate system. A user input orientation is assigned to the touch sensitive surface such that it matches the angular orientation of the touching finger. When a finger gesture is detected on the touch sensitive surface, it is then interpreted by reference to the assigned user input orientation.

20 Claims, 7 Drawing Sheets

SELF-ALIGNING USER INTERFACE

TECHNICAL FIELD

The present disclosure is related generally to mobile electronic communications devices and, more particularly, to systems and methods for facilitating user interactions with a user interface of a mobile electronic communications device.

BACKGROUND

As mobile devices such as cell phones and smart phones become smaller and more convenient, they may also change form factor to be more pocketable, more easily handled and so on. While some form factors such as rectangles are inherently directional, other possible form factors such as circles may not have any noticeable directionality. Nonetheless, a user may still need to interact directionally with a user interface on the device, and this can be difficult if both the device shell and user interface screen lack readily apparent directionality.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objectives and advantages, may be best understood from the following detailed description taken in conjunction with the accompanying drawings of which:

DETAILED DESCRIPTION

Figure 1:
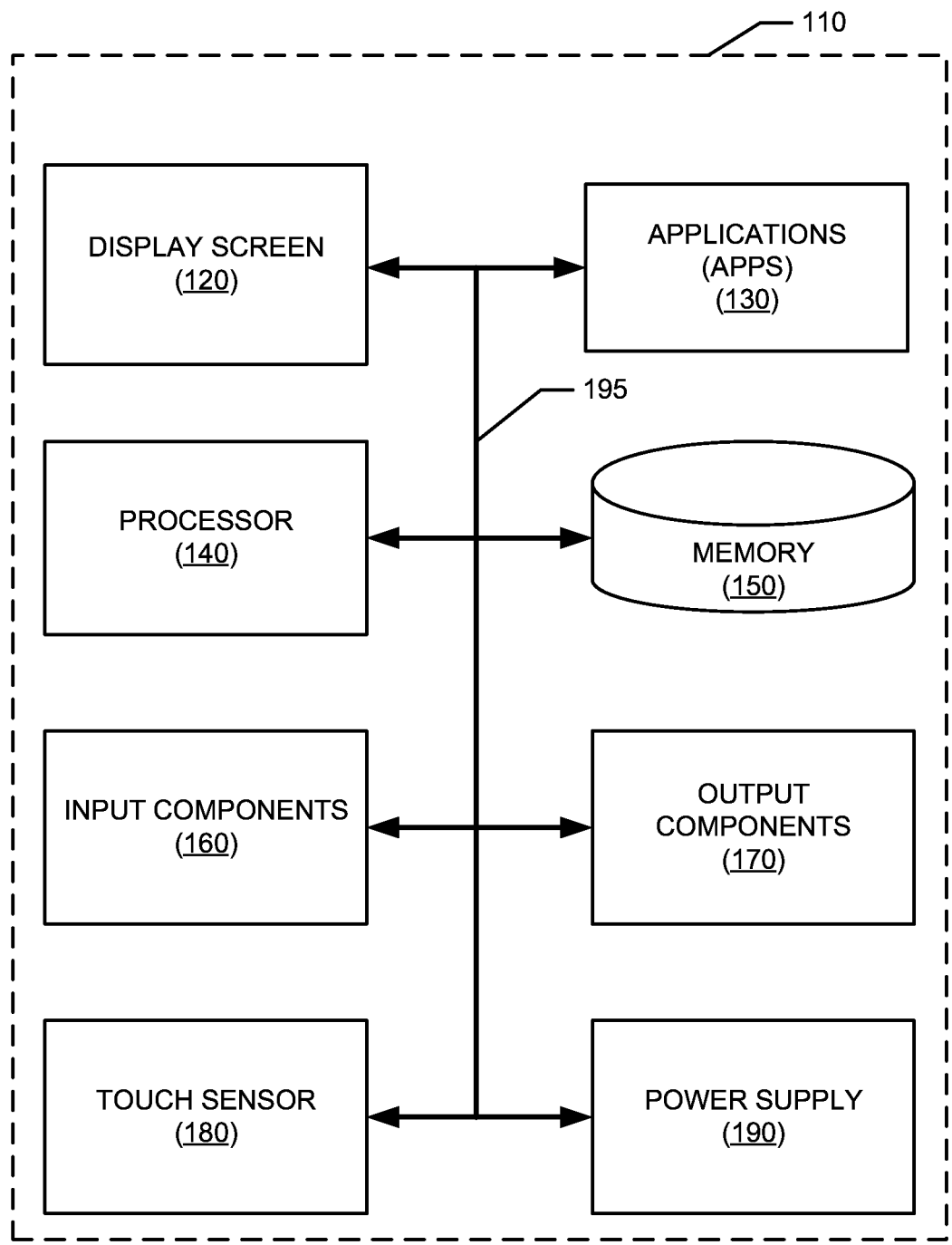
FIG. 1 is a schematic representation of a mobile electronic device in which various embodiments of the disclosed principles may be implemented.

Before discussing embodiments of the disclosed principles in full detail, an overview of certain embodiments is given to aid the reader in understanding the later more detailed discussion. As noted above, mobile devices such as cell phones and smart phones having essentially nondirectional form factors such as circles and ovals may not have any noticeable directionality. This can be true of the device shell and the device user interface screen, however users typically still need to interact with the device's user interface in a directional manner.

The lack of readily apparent directionality in such interfaces may confuse the user, resulting in wasted time or erroneous command entry. In addition, if the user must visually align the interface, then manipulation of the device in the dark or in the user's pocket is more difficult.

In an embodiment of the disclosed principles, an automatically aligned interface provides an improved experience, especially with respect to scenarios wherein the user is not able to visually ensure proper orientation, such as when the device is in the user's pocket. Although various embodiments will be exemplified via circular user interface geometries, it will be appreciated that other interfaces that are substantially though not completely nondirectional can also benefit from the disclosed principles. As used herein, a substantially nondirectional interface or device is an interface or device whose directionality, if any, cannot be immediately ascertained by a user via touch or sight.

It will be appreciated that the described principles may also be applied to plainly directional devices and interfaces such as squares and rectangles, if desired, in order to eliminate the need for a user to orient the device. For example, it may be difficult for a user to determine orientation of a square or rectangular device by feel, e.g., in the dark or when the device is in the user's pocket or purse. In such cases, it may be beneficial to align the interface with the user automatically rather than forcing the user to orient the device.

Automatic orientation of the interface to the user for input purposes is accomplished in various embodiments by first determining the orientation of the user's finger on the device screen, that is, the angular orientation of the finger relative to an axis perpendicular to the screen. The direction of user input is then redefined relative to the user's finger. For example, an acceptable user input action may be to touch the sensor with a finger and swipe right to skip songs in playlist. In accordance with the disclosed principles, a right swipe is recognized if the user swipes their finger rightwards on the screen, as determined in the frame of reference of the finger, regardless of device orientation.

In practice, the input direction may be undefined or randomly aligned while the device sits on a table or other flat surface with no touch present. When the user places a recognized finger on the fingerprint sensor (FPS), the input targets are rotated to align to the finger's orientation. In an embodiment, an accelerometer (tilt-sensor) may be used to detect a non-flat orientation as well as to align the device's input relative to gravity, e.g., assuming the finger will be oriented from the lowest edge of the device to the middle, when the touch sensor is touched. In another embodiment, an array of perimeter hover sensors is activated when the user touches a central touch sensor, to determine at which angle the back of the finger is located. The device then extrapolates the front of the finger, and rotates the user input accordingly. In addition to determining the orientation of the user's finger using fingerprint sensing, a tilt sensor, or touch and hover sensors, the device may also use the angular difference between enrollment on a fingerprint sensor and each touch event to determine the angular offset of the finger for each touch.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Thus, for example, while FIG. 1 illustrates an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example, one or more antennas and associated circuitry and logic. The antennas and associated circuitry may support any number of protocols, e.g., WiFi, Bluetooth, cellular, etc.

The device 110 as illustrated also includes one or more output components 170 such as RF (radio frequency) or wired output facilities. The RF output facilities may similarly support any number of protocols, e.g., WiFi, Bluetooth, cellular, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments.

In an embodiment, one or more touch sensors 180 provide touch detection to detect a user's finger touch on, for example, the device screen. The touch sensor 180 may be part of the screen or may simply overlay or underlay the screen. In an embodiment, the touch sensor 180 is also configured to not only detect touch, but to identify a finger as such (as a finger and not another object) and optionally gather sufficient additional identifying indicia (e.g., fingerprint) to allow authentication of the finger as belonging or not belonging to an authorized user.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display and may or may not include the one or more touch sensors 180.

Figure 2:
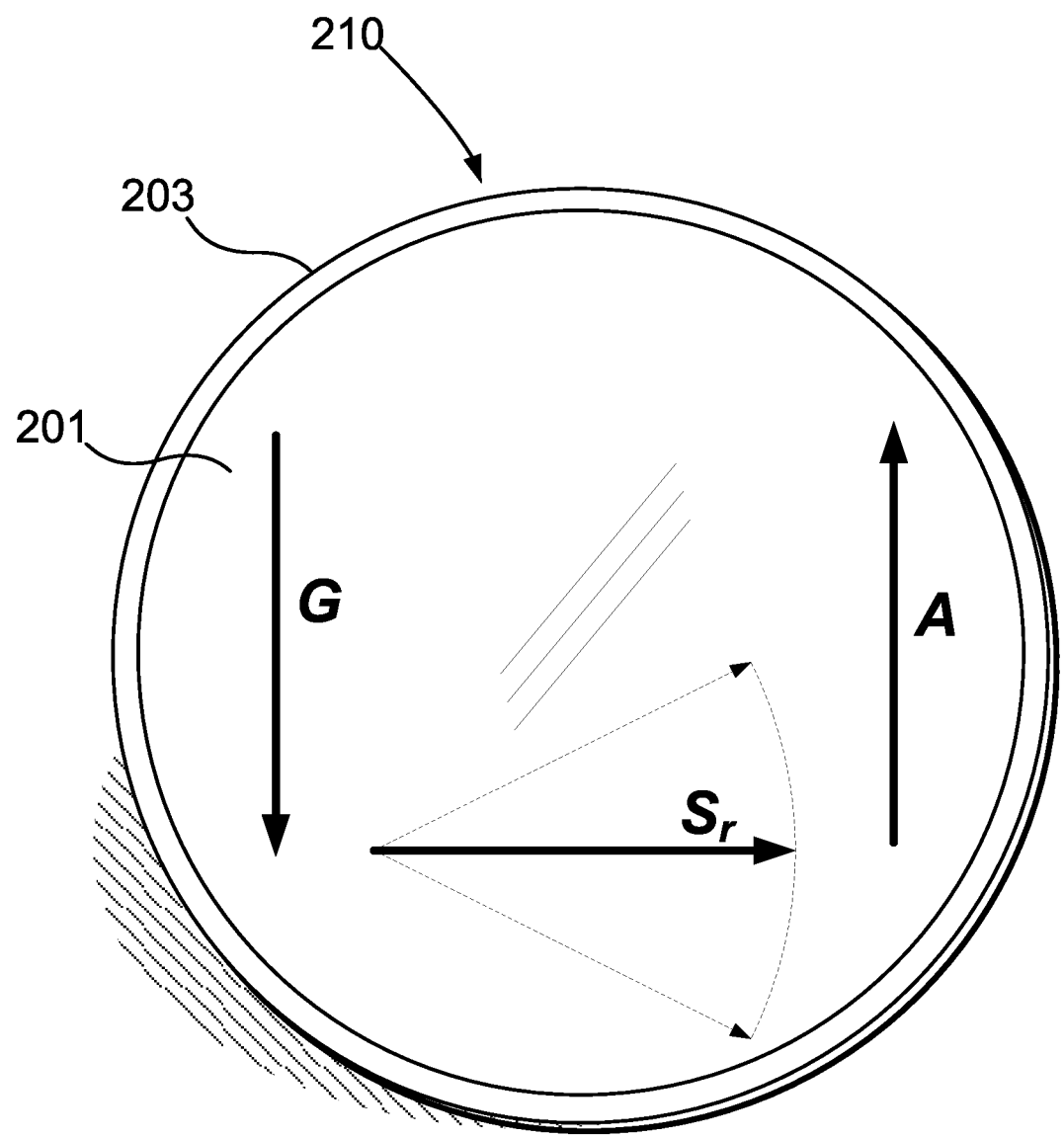
FIG. 2 is a front perspective view of a device within which various embodiments of the disclosed principles may be implemented.

FIG. 2 is a front plan view of a device 210 (110) in accordance with the described principles. As can be seen, the device 210 includes a display 201 (120) within a device housing or body 203. In the illustrated example, the device display 201 is a touch-sensitive display configured to detect a user's touch, such as may occur during a swipe motion with a finger. It will be appreciated that acceptable swipe gestures may be defined by the manufacturer of the device 210 or its operating system, or may be customized by the user, to include swipe direction (up, down, left, right) and associated meaning (return to home screen, open, close, drop menu etc.).

An example input axis A is shown aligned vertically, e.g., aligned with the local gravity vector G. In this situation, a rightward swipe ("right swipe") is a swipe on the display 201 that is predominantly in the horizontal axis direction $S_r$, and that is within a predefined angular deviation from $S_r$, e.g., 30°.

Figure 3:
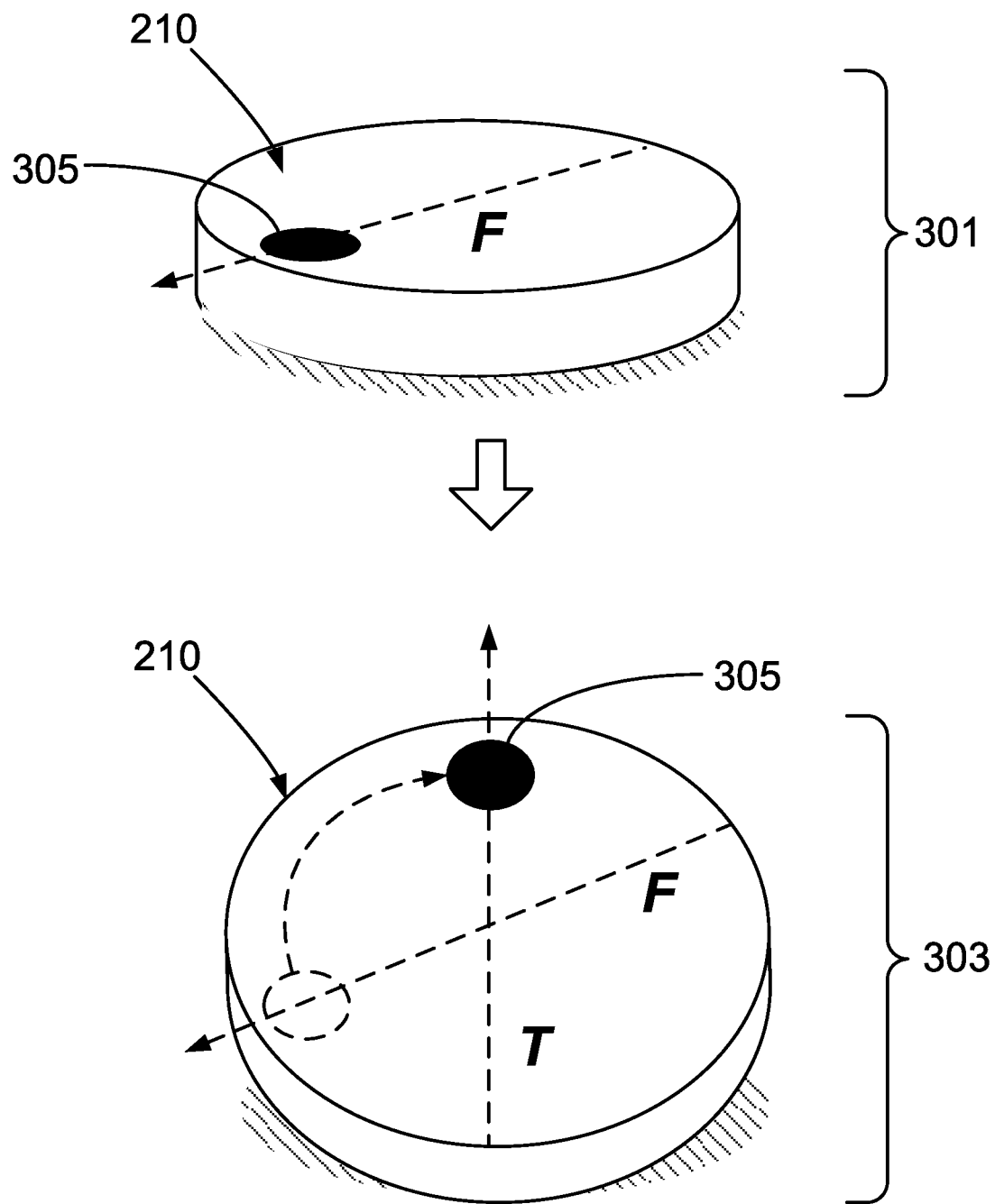
FIG. 3 is 2-stage perspective view showing orientation resolution in accordance with an embodiment of the disclosed principles.
Figure 4:
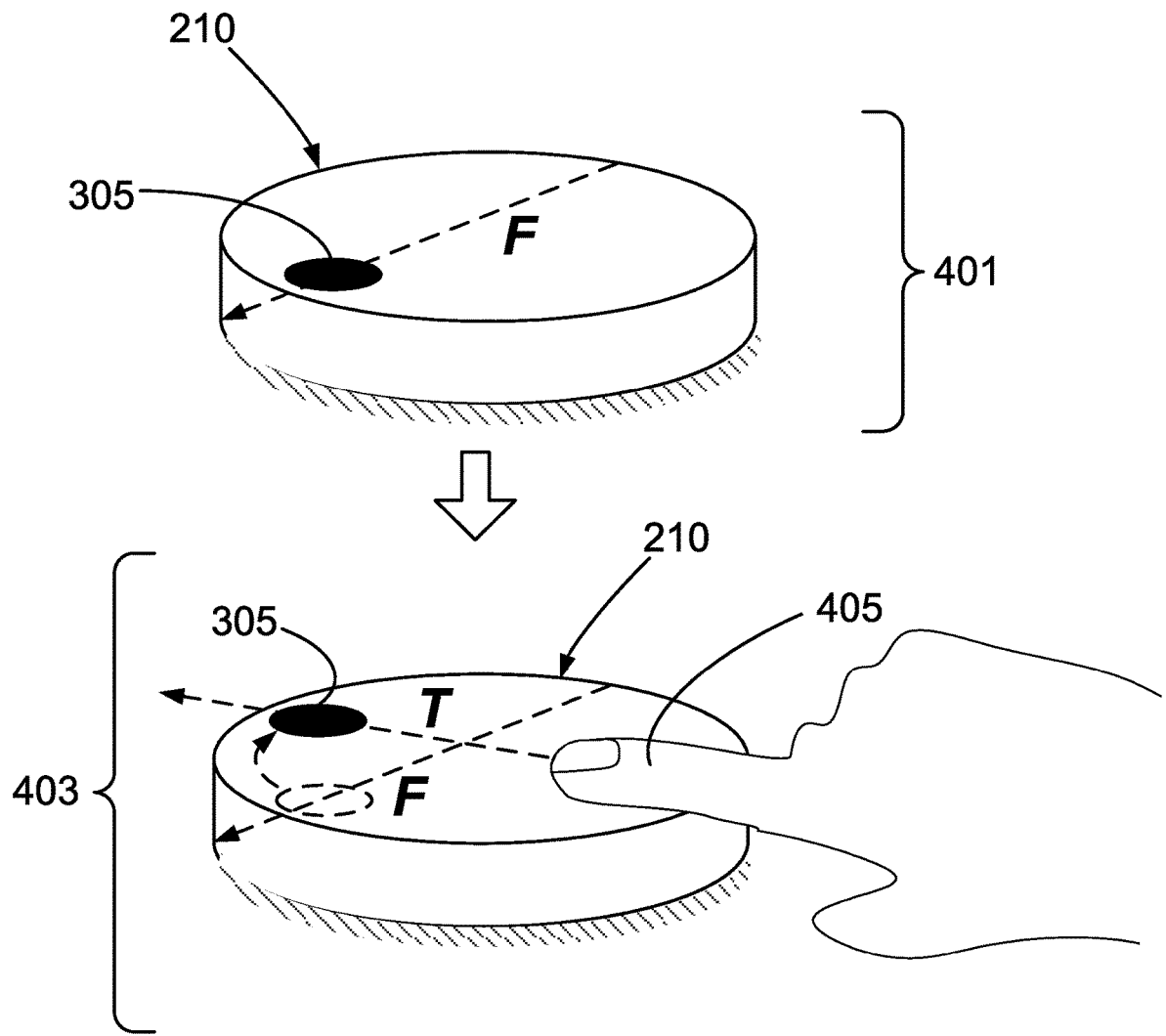
FIG. 4 is 2-stage perspective view showing orientation resolution in accordance with an embodiment of the disclosed principles.
Figure 5:
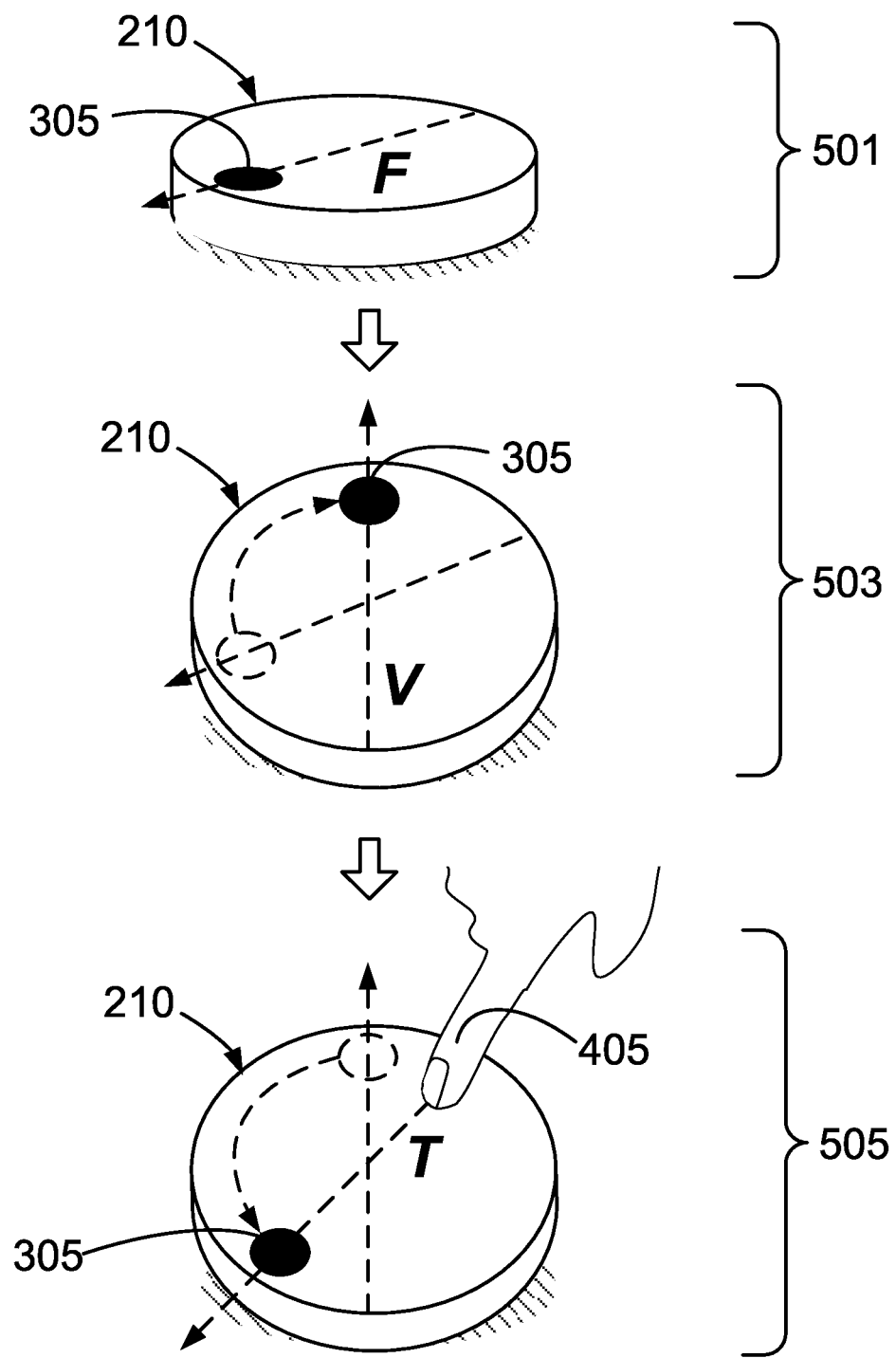
FIG. 5 is 3-stage perspective view showing orientation resolution in accordance with an embodiment of the disclosed principles.

Turning to FIGS. 3-5, these figures illustrate the device 210 of FIG. 2, in various positions and contact situations, and the response of the user interface direction in such circumstances. In FIG. 3, the device 210 is illustrated in a flat position 301 and then a tilted position 303. In both positions, an orientation mark 305 is shown in order to aid the reader in perceiving the direction of the user interface. In the illustrated examples, the orientation mark 305 is located toward the top of the interface. It will be appreciated that the orientation mark 305 is simply an aid for the reader and need not be shown on the display of the device 210. Indeed, as noted above, the display remains dark during user interaction in certain embodiments, and the user would not be able to see any directionality marks or aids in such embodiments.

Referring now more specifically to FIG. 3, it can be seen that the orientation mark 305 is arbitrarily aligned along vector F in context 301 wherein the device is lying flat. The orientation may be an artifact of the last use, or may be assigned as a default. Alternatively, the user input need not have any orientation at all when the device 210 is lying flat in the absence of user interaction.

When the device is tilted out of the horizontal plane, as in context 303, the user input rotates such that orientation mark 305 moves to the top of the screen on the vertical axis V. In this case, the vertical axis is defined by the direction of local gravity, as sensed by the device. In this way, the device 210 is prepared to accept ordinary up/down, left/right commands in the user's presumptive frame of reference (standing or sitting upright).

However, it will be appreciated that the user may not actually be standing or sitting upright when the device is tilted out the horizontal plane. For example, the device may be in a user's pocket or purse, and the user may interact with the device without actually looking at the device or the device screen. In such a situation, the frame of reference for user input is not the user's own frame of reference, but rather the frame of reference of the user's finger, which may be very different from the user's frame of reference.

Thus, in an embodiment, the device 210 is configured to detect a finger on the display, determine its orientation, and orient the user input based on the orientation of the finger. If the touch screen is or incorporates a fingerprint sensor, the orientation of the fingerprint ridges is used in an embodiment to determine the orientation of the finger itself. Other mechanisms for determining finger orientation may also be used.

In the above embodiment, if a user reaches down into his or her pocket to touch the device screen, the frame of reference of the finger may be such that the device user input is actually upside down relative the user's frame of reference and relative to gravity. Nonetheless, in this case, the device rotates its user input to the finger's frame of reference.

FIGS. 4 and 5 show user input rotations in accordance with this embodiment. As can be seen in FIG. 4, the orientation mark 305 is again arbitrarily aligned along vector F in context 401 when the device is lying flat. As discussed above, this orientation may be an artifact of the last use, or may be assigned as a default, or there may be no assigned orientation at all when the device 210 is lying flat in the absence of user interaction.

When the user's finger 405 touches the screen of the device 210, as in context 403, the device detects the finger 405 and its orientation, and rotates the user input such that orientation mark 305 moves to the top of the screen as redefined by the touch axis T As noted above, this same touch-based reorientation of the user input occurs even when the device is not lying flat.

Thus, referring to FIG. 5, it can be seen that in context 501, the orientation mark 305 is aligned along vector F when device is lying flat. This vector, again, may be an artifact of the last use, or may be a default. Alternatively, the user input need not have any orientation in this condition. When the device 210 is tilted, as in context 503, the user input rotates such that orientation mark 305 moves to the top of the screen on the vertical axis V, as defined by the direction of local gravity. In this orientation, the device 210 is prepared to accept ordinary up/down, left/right commands in the user's presumptive frame of reference (standing or sitting upright).

However, if the user's finger 405 now touches the screen of the device 210, as in context 505, the device detects the finger 405 and its orientation, and rotates the user input away from the vertical axis V to now align with the axis T of the finger, also referred to as the touch axis T This rotation can be seen by the movement of the orientation mark 305.

Figure 6:
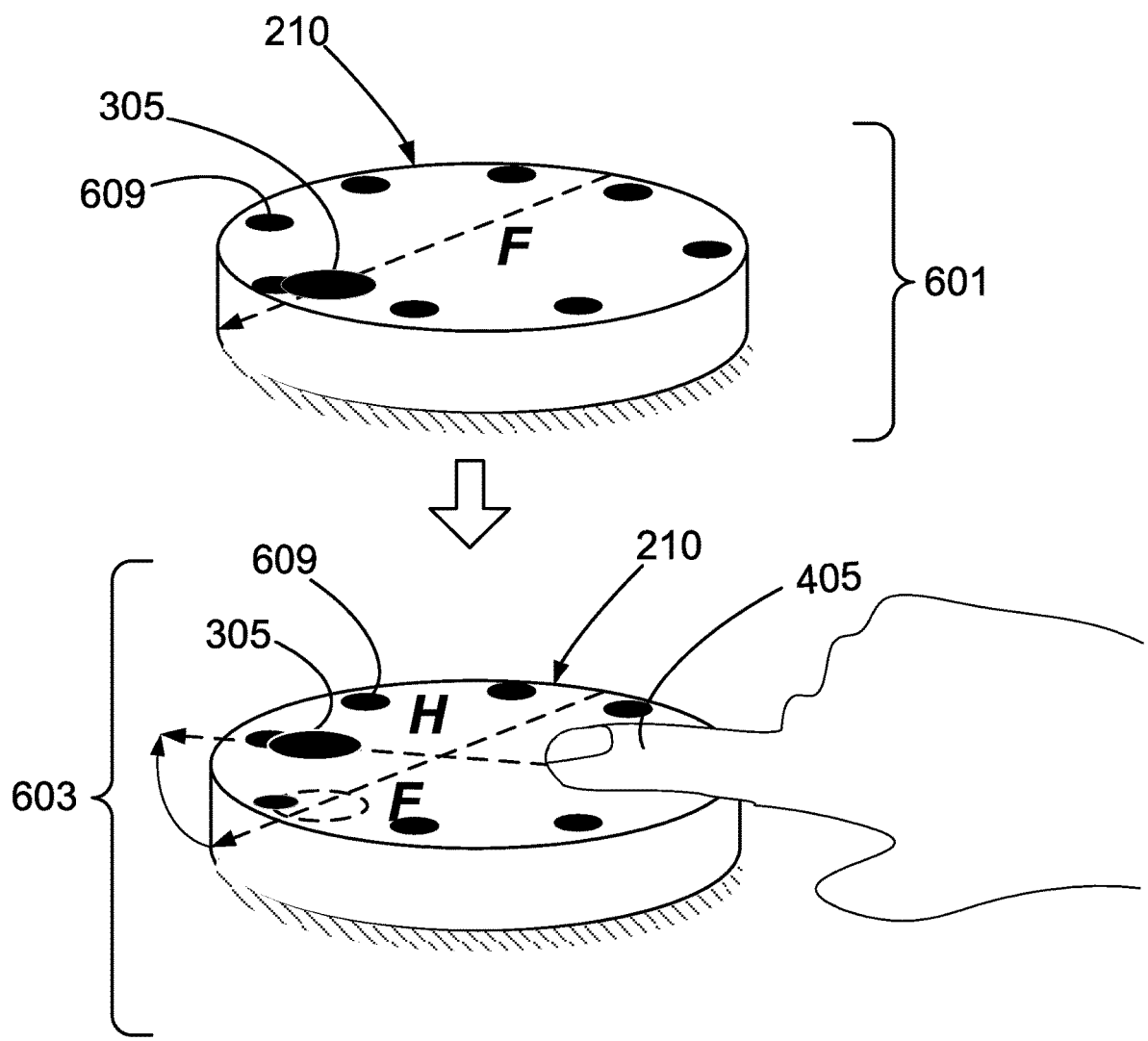
FIG. 6 is 2-stage perspective view showing orientation resolution in accordance with an embodiment of the disclosed principles.

As noted in overview above, hover sensors are used in a further embodiment to determine a touch orientation and thus to assign a user input orientation. Referring now to FIG. 6, the hover sensors 609 may be, for example, thermal sensors, optical sensors, capacitive sensors or otherwise. In this embodiment, an array of perimeter hover sensors 609 are provided around the touch screen 201. When the user touches the screen 201 at an orientation H, e.g., at a central touch sensor or otherwise, the finger 405 is detected, and the perimeter hover sensors 609 are activated. Data from the perimeter hover sensors 609 are then used to determine at which angle the back of the finger is located. The device 210 then extrapolates to infer the position of the front of the finger, and rotates the user input accordingly to align with orientation H. As with the embodiment shown in the other figures, this functionality may be used alternatively, but may also be used in concert with other embodiments.

With respect to using the ridges to infer orientation, the finger's orientation would be stored, in an embodiment, during the initial fingerprint training process for the device 210. In an embodiment, the device accelerometer is used to facilitate training at arbitrary angles. In a further embodiment, the fingerprint sensor continues to monitor finger rotation during a user interaction, after the initial touch, allowing the UI to remain oriented correctly to the finger's actual position.

In an alternative embodiment, a camera or presence sensor (such as a thermal or radar sensor) is used to detect the user's body relative to the device, so that the device can then rotate the user interface accordingly.

Figure 7:
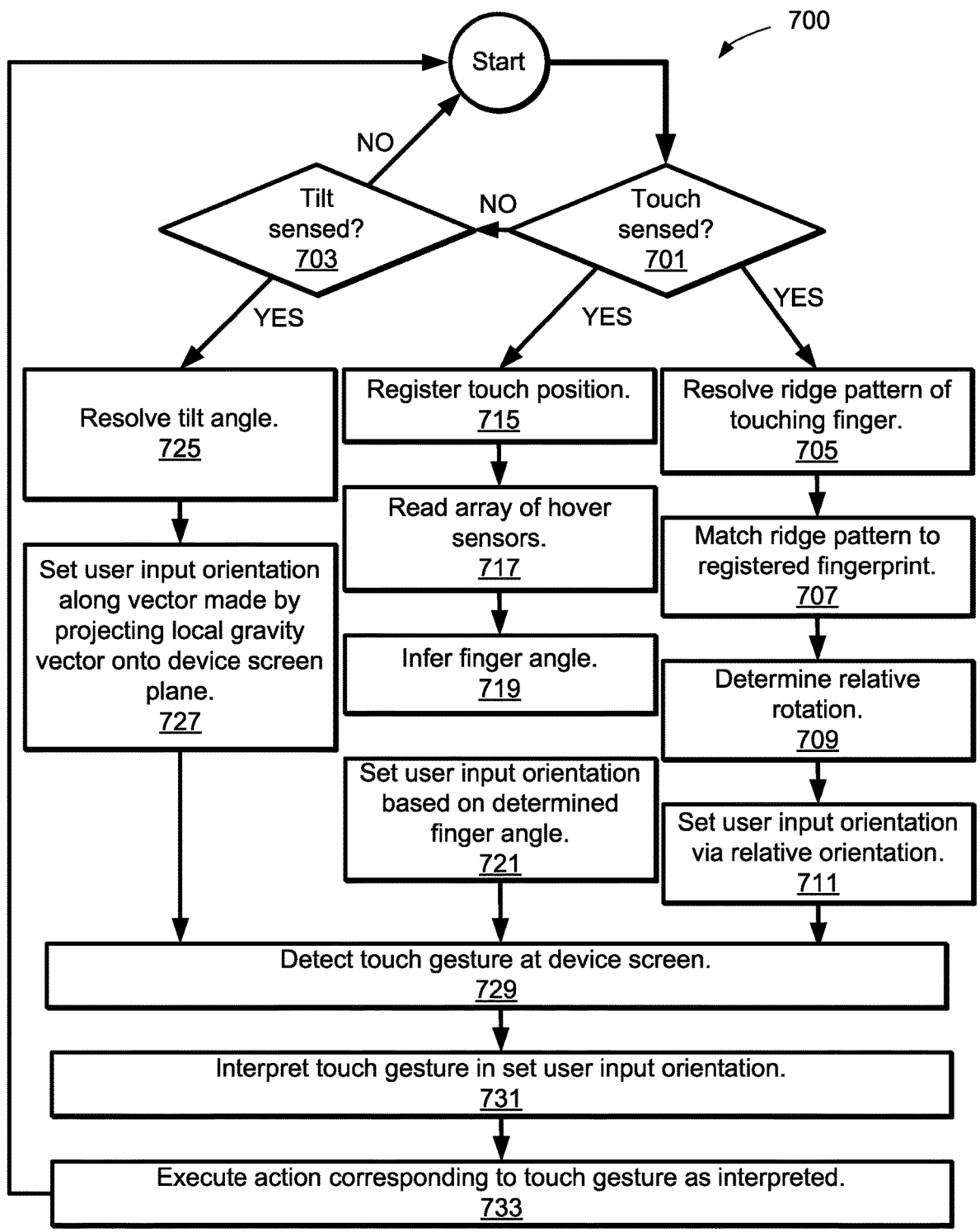
FIG. 7 is a flow chart showing a process of user input orientation and touch gesture interpretation in accordance with an embodiment of the disclosed principles.

Other aspects of the device operation will be appreciated from FIG. 7, which shows a flow diagram of device operations relative to interface orientation. The illustrated process 700 shows alternative process flow paths depending upon the type of orientation detection implemented. It will, however, be appreciated that the described embodiments are not required to be used alternatively, but may be used in concert with one or more other embodiments.

Turning to the figure, the process 700 begins with the device, such as device 210, in a powered but idle mode, or standby mode at stage 701. In this mode, a touch or tilt will be detected if one or were to occur. At stage 701, if a touch is detected on the screen 201 of the device (or on a device fingerprint sensor if the sensor does not cover the screen 201), the process flows to stage 705 or 715 depending upon the implementation. In particular, the process flow path from 705 to 729 describes the operation of the device when the orientation implementation utilizes finger print ridge orientation, and the process flow path from 715 to 729 describes the operation of the device when the orientation implementation utilizes hover sensors.

If a touch is not detected at stage 701 but a tilt is detected at stage 703, the process flows to stage 725, wherein the path from 725 to 729 describes the operation of the device when the orientation implementation utilizes one or more tilt sensors.

Returning to stage 705 to discuss specific process operations, the device 210, having detected a touch, scans the touch surface (or FPS surface) to resolve a ridge pattern of the touching finger. The device then matches the resolved ridge pattern to that of a registered fingerprint at stage 707, with the registered fingerprint having a known orientation when registered, e.g., vertical. The device 210 then determines a relative rotation between the scanned fingerprint and the registered fingerprint at stage 709, and sets the current user input orientation at stage 711 based on the determined relative orientation. From stage 711, the process 700 flows to stage 729.

Returning now to stage 715, to discuss specific process operations, the device 210, having detected a touch, registers the touch position at stage 715, reads the array of hover sensors (e.g., sensors 609) to locate the back of the finger at stage 717, and infers the finger angle at stage 719 based on the angle between the touch location and the back of the finger. The device 210 then sets the user input angle at stage 721 based on the determined finger angle. From stage 721, the process 700 flows to stage 729.

Returning now to stage 725, to discuss specific process operations, the device 210, has detected a tilt at stage 703. At stage 725 then, the device 210 resolves the tilt angle, and at stage 727 sets the user input orientation along the vector compromised of projecting the local gravity vector onto the device screen plane. From stage 727, the process 700 flows to stage 729.

At stage 729, the device 210 detects a touch gesture at the device screen, and at stage 731, the device 210 interprets the received touch gesture as if it were made relative to the user input orientation from stage 727 (or one of stages 711 or 721 depending upon implementation). Finally at stage 733, the device 210 executes an action corresponding to the interpreted touch gesture.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile electronic communications device with a self-aligning user interface, the mobile electronic communications device comprising:
a touch sensitive display screen presenting a user interface spanning an entirety of the touch sensitive display screen and aligned along a reference vector; and
a processor linked to the touch sensitive display screen and configured to detect a finger touch on the touch sensitive display screen, determine an angular orientation vector of a touching finger in a continuous angular coordinate system, assign a user input orientation for the touch sensitive display screen by rotating an entirety of the user interface such that the reference vector is aligned with the angular orientation vector of the touching finger, detect a finger gesture on the touch sensitive display screen, and interpret the finger gesture by reference to the user input orientation.

2. The mobile electronic communications device in accordance with claim 1, wherein the processor is further configured to determine the angular orientation vector of the finger touch by resolving a ridge structure of the finger touch.

3. The mobile electronic communications device in accordance with claim 1, wherein the user interface comprises graphical user interface objects linked to executable applications, wherein rotation of the user interface rotates all graphical user interface objects of the user interface.

4. The mobile electronic communications device in accordance with claim 3, wherein at least one graphical user interface object consists of an icon presented on the user interface.

5. The mobile electronic communications device in accordance with claim 1, further comprising a tilt sensor that yields tilt data describing a tilt of the mobile electronic communications device with respect to gravity, and wherein the processor is further configured to assign the user input orientation based upon the tilt data prior to detecting a finger touch on the touch sensitive display screen.

6. The mobile electronic communications device in accordance with claim 1, further comprising a plurality of hover sensors associated with the touch sensitive display screen, and wherein the processor is further configured to determine the angular orientation vector of the finger touch by detecting a touch location via the touch sensitive display screen and by detecting a location of a portion of the finger touch via at least one of the plurality of hover sensors.

7. The mobile electronic communications device in accordance with claim 6, wherein determining the angular orientation vector of the finger touch further comprises determining that the angular orientation vector of the touching finger lies on a common axis with both the touch location and a detected location of a hovering portion of the touching finger.

8. The mobile electronic communications device in accordance with claim 1, further comprising an image sensor, and wherein the processor is further configured to confirm the angular orientation vector of the finger touch via the image sensor.

9. The mobile electronic communications device in accordance with claim 1, further comprising a thermal sensor, and wherein the processor is further configured to confirm the angular orientation vector of the finger touch via the thermal sensor.

10. The mobile electronic communications device of claim 1, wherein the mobile electronic communications device comprises a circular device housing with the touch sensitive display screen concentrically located in, and defining a major surface of, the circular device housing, wherein rotation of the reference vector occurs in forty-five degree increments.

11. A method of providing a mobile electronic communications device with a self-aligning user interface, the method comprising:
presenting the self-aligning user interface on a touch sensitive display screen with the self-aligning user interface bounded by a perimeter of the touch sensitive display screen and having a self-aligning user interface direction defined by an orientation vector;

detecting a finger touch on the touch sensitive display screen;

determining an angular orientation vector of the finger touch in a continuous angular coordinate system; and rotating the orientation vector such that the orientation vector is aligned with the angular orientation vector of the touching finger within a predefined angular deviation, thereby changing an entirety of the self-aligning user interface direction.

12. The method in accordance with claim 11, further comprising rotating an orientation mark aligned with the orientation vector and presented on the self-aligning user interface to indicate an orientation of the orientation vector.

13. The method in accordance with claim 12, wherein rotating the orientation vector translates the orientation mark from a first location on the touch sensitive display screen to a second location on the touch sensitive display screen that is axially displaced from the first location.

14. The method in accordance with claim 13, wherein the orientation mark is located at a top portion of the self-aligning user interface.

15. The method in accordance with claim 11, wherein rotation of the orientation vector occurs while the touch sensitive display screen is dark.

16. The method in accordance with claim 11, further comprising, prior to detecting the finger touch, determining a direction of local gravity when the mobile electronic communications device is tilted and causing the orientation vector to align with the direction of local gravity and causing an orientation mark aligned with the orientation vector to move to a top of the touch sensitive display screen along a vertical axis defined by the direction of local gravity.

17. The method in accordance with claim 16, wherein rotation of the orientation vector translates the orientation mark to a bottom of the touch sensitive display screen.

18. The method in accordance with claim 11, wherein rotation of the orientation vector causes all graphical user interface objects of the self-aligning user interface to rotate.

19. The method in accordance with claim 11, wherein rotation of the orientation vector causes an orientation mark located at a top of the self-aligning user interface to rotate along the touch sensitive display screen in an arc.

20. A method in a mobile electronic communications device of providing a self-aligning user interface, the method comprising:

determining a finger touch on the mobile electronic communications device;

determining an orientation vector of the finger touch, wherein the orientation vector of the finger touch may be any angle within a continuous angular coordinate system; and rotating an entire user interface on the mobile electronic communications device such that an alignment vector indicating a rotational orientation of the self-aligning user interface has an angular orientation aligned with the orientation vector of the finger touch to a highest available resolution of the continuous angular coordinate system.

* * * * *